3,214,400
BORIC ACID-MODIFIED POLYESTER COMPOSITIONS
Raymond P. Silver, Kennett Square, Pa., assignor to Hercules Powder Company, Wilmington, Del., a corporation of Delaware
Filed Jan. 11, 1956, Ser. No. 558,582
8 Claims. (Cl. 260—29.2)

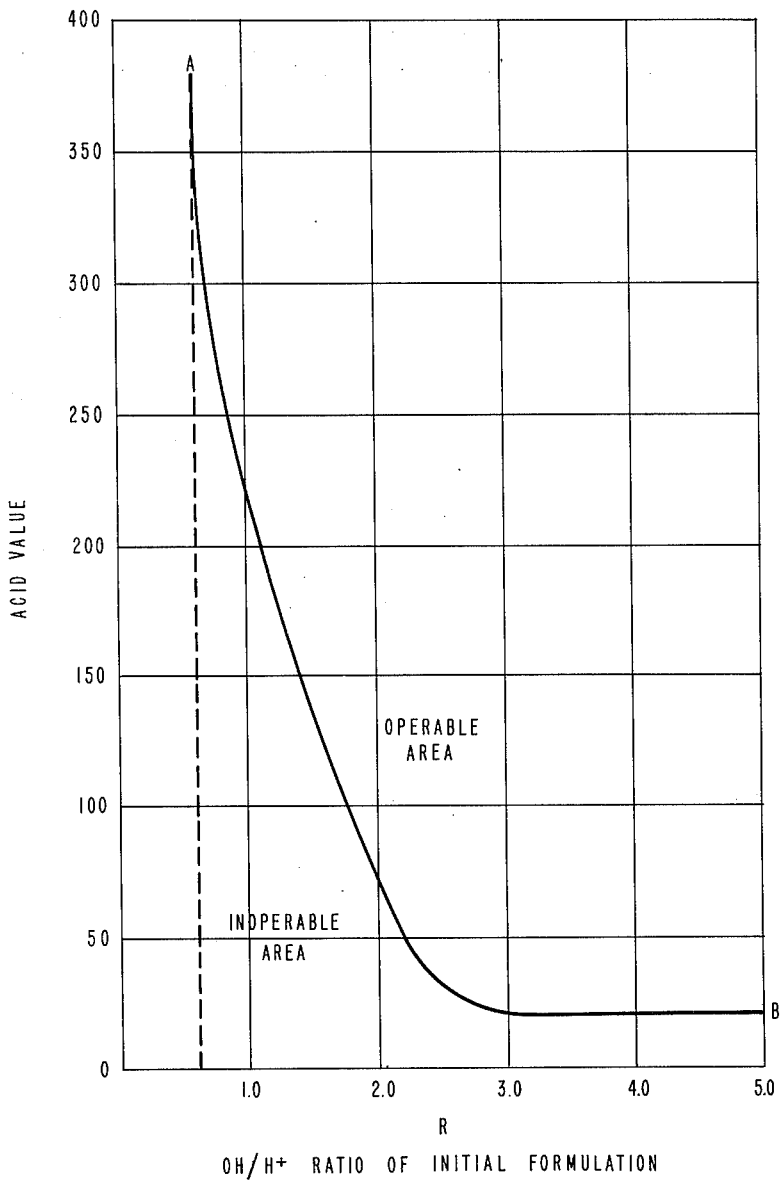

The present invention relates to aqueous solutions of reaction products of a polyhydric alcohol, an $\alpha,\beta$-unsaturated dicarboxylic acid or anhydride, and boric acid. It further relates to aqueous solutions of such reaction products which can be converted to the insoluble and infusible state by the application of heat. It still further relates to coating or impregnating compositions containing any of the aforesaid solutions.

Reaction products of the type designated above, assuming reaction has taken place to the extent required to give rise to the resinous state, are known to the art as alkyd or polyester resins.

Various attempts have been made by the art to apply alkyd resins via aqueous solutions or dispersions thereof. The advantages of the use of water are substantial. Not only is the expense of organic solvents eliminated; but the use of water makes it possible to apply the resins at high temperatures which would cause a fire hazard in the presence of inflammable organic solvents. Unfortunately, however, the prior art attempts to use water as the solvent or carrier have not been entirely successful.

One device for using water as the carrier has been to first prepare an alkyd resin of rather high acid value and then solubilize the same in water by the use of ammonia, inorganic bases such as NaOH, KOH, etc., as well as water-soluble organic bases such as the ethanolamines. This device has its disadvantages due to the fact that the alkaline solubilizing agents that cannot be volatilized lower the water-resistance of the ultimate film, whereas the volatile alkaline solubilizing agents seriously affect the speed of convertibility of films containing the same.

It has been sought to avoid the introduction of the aforementioned reagents by using as the polyhydric alcohol in the resin-forming reaction an alcohol containing a number of ether groups such as hexaethylene glycol, reliance being placed on the ether groups to provide water-solubility. Although the resins resulting from the application of this concept are soluble in water at high concentrations of resin, such resin solutions will not stand substantial dilution with water to provide the low concentrations which would be desirable either for technical reasons relating to application or for sake of economy. Among the other disadvantages of this type of resin is the tendency toward water-sensitivity due to the large number of ether groups present. Other methods for using water as a carrier have involved emulsification of the alkyd in water. These methods have been uniformly unsatisfactory due to the fact that the agents introduced to effect emulsification or dispersion disadvantageously affect the properties of the ultimate film.

One answer to the needs of the art is provided by the compositions described in U.S. Patent 2,646,410 to Joseph Wayne Kneisley. The compositions of that patent are aqueous solutions of reaction products of a polyhydric alcohol and an $\alpha,\beta$-unsaturated dicarboxylic acid, which compositions are water-soluble by virtue of a critcal selection of reactants and control of the extent of reaction. The compositions of the patent have, among other applications, proved to be excellent binders for glass wool fibers to be used, for example, in the manufacture of insulating batts.

It is the practice in the manufacture of fibrous glass wool products to utilize the compositions of the aforesaid patent in combination with other resinous materials, notably phenol—formaldehyde resins. For reasons of economics, it is desirable to utilize as much phenol—formaldehyde resin in the combination as is possible but since phenol—formaldehyde resins are subject to punking at high temperatures, the amount of such resin that can be tolerated is limited to a relatively small percentage of the total weight of the combination. There thus exists a definite demand for compositions of the general nature of those described in the aforesaid patent which can tolerate a greater amount of other resinous materials in the preparation of non-punking binders for glass wool.

In accordance with the present invention, it has been found that the replacement with boric acid of a portion of the $\alpha,\beta$-unsaturated dicarboxylic acid on an equivalent stoichiometric basis in preparing compositions of the type described in the aforesaid patent results in a modified composition having greater tolerance of other resins when employed as a component of a non-punking binder for glass wool. The boric acid-modified compositions furthermore have even greater water dilutability than those of the prior art at the same acid number. The invention thus provides aqueous solutions of reaction products of a polyhydric alcohol, an $\alpha,\beta$-unsaturated dicarboxylic acid, and boric acid.

In preparing the aqueous solutions of this invention, it is necessary to take into account a number of different factors. These factors relate either to (1) the nature and proportions of the reactants which are employed or (2) the extent of reaction. The products which are employed in forming the aqueous solutions are either in the resinous state at the time of their employment or they are incipient resins. In view of the fact that it is difficult to draw the line of demarcation between such products, they will be referred to hereinafter simply as "reaction products."

More specifically, the reaction products which are used in accordance with the invention are those obtained by partially esterifying a polyhydric alcohol, boric acid, and an unsaturated dicarboxylic acid or anhydride selected from the group consisting of maleic acid, maleic anhydride, and fumaric acid. Although the invention will be described hereinafter with respect to maleic anhydride, it will be understood that maleic acid or fumaric acid can be employed equivalently therefor. The polyhydric alcohol must be an alcohol having from 2 to 6 inclusive hydroxyl groups per molecule or mixtures thereof. The polyhydric alcohol employed must contain no oxygen except that in the form of hydroxyl groups. Furthermore, it must have an OH/C ratio of 0.6 to 1.0, inclusive. (OH/C ratio as used herein means the ratio of the number of hydroxyl groups to the number of carbon atoms contained in a given compound.)

In preparing the reaction products, the reactants may be used in various proportions. They must, however, be employed in such proportions as to provide a heat-convertible reaction products; i.e., one which when heated in the presence of air at a temperature below its decomposition temperature will become insoluble and infusible.

The useful reaction products, in accordance with this invention, are those having at least half of the acid groups (including both the actual or potential acid groups supplied by both the boric acid and the unsaturated dicarboxylic acid) originally presented by the reactants esterified (as evidenced by the acid value of the reaction product) but at the same time having an acid value of at least the minimum value for the particular OH/H+ ratio employed, as defined by line AB of the attached drawing. The OH/H+ ratio as used herein means the ratio of the number of hydroxyl groups to the number of acid groups in the initial formulation and is referred to as R hereinafter. Also, in order to provide the specified advantages, the proportion of reactants must be so chosen as to provide a $BO_3$ content in the final reaction product of from about 1.5 to 8%, preferably from 3 to 4.5%.

The drawing represents the relationship between $OH/H^+$ ratio and acid value for the reaction products with which this invention is concerned. The abscissa represents various values of $OH/H^+$ ratio, whereas, the ordinate represents various values of acid value. The curve AB represents the locus of minimum values of acid value which obtain from various $OH/H^+$ ratios. Thus, for example, at $OH/H^+$ ratios of 2, the minimum acid value which provides a reaction product within the scope of the invention is about 80. The aforesaid reaction products in the form of their aqueous solutions constitute the present invention. Not only can these reaction products be dissolved in water with or without the aid of alkaline solubilizing or other agents, but also the other aqueous solutions can be diluted with water to the extent of providing aqueous solutions of 10% or less solids concentration. The exceptional water dilutability characteristic permits the formulation of aqueous solutions of extremely low viscosity which can be easily applied by spraying, impregnating, etc. Furthermore, such dilute solutions permit the application of extremely low amounts of resin on the objects to which the resin is applied. Hence, increased economy of operation is possible.

Another important characteristic of the subject aqueous solutions lies in their ability in the form of thin films to be heat-converted with ease to the insoluble, infusible state. No oxidation or peroxide-type polymerization catalysts are needed, although they may be used, if desired. The cured reaction products evidence remarkable flexibility. They are further characterized by light color and excellent color stability. The cured products are extremely water resistant. In this respect in particular they represent a substantial improvement when compared with the cured products resulting from the majority of prior art methods of utilizing alkyd or polyester resins in aqueous media.

Having described the generic aspects of this invention, the following specific examples are given as specific embodiments thereof. These specific examples are not, however, to be construed as limiting the invention.

*Example 1*

Twenty-two and three-tenths parts of maleic anhydride, 8.83 parts of ethylene glycol, 44.7 parts of pentaerythritol, and 2.35 parts of boric acid were charged to a reaction vessel equipped with a thermometer, carbon dioxide sparge tube, stirrer, and steam condenser. The pentaerythritol used in this and subsequent examples was a technical grade material having an equivalent weight of 37. The $OH/H^+$ ratio of this charge was 2.65. The mixture was agitated and water was added until a fluid slurry was obtained, this requiring the addition of 18.6 parts of water. The reaction vessel was flushed out with carbon dioxide and the mixture was heated to 170–190° C. After 6 hours of concentration, the acid value of the product was 51. The reaction product, exclusive of water, contained 3.2% $BO_3$. At this point water was poured into the vessel to provide a 75% solids solution. This solution was further diluted with water to 10% solids, at which concentration the solution remained perfectly clear. The solution was then sprayed on an aluminum plate to provide a film of approximately 5-mils thickness and the film was cured to the insoluble, infusible state by heating to 250° C. for 10–12 minutes.

The solution was next blended with a commercial phenol—formaldehyde resin and water to provide a glass wool binder containing 15% solids by weight with the phenol—formaldehyde resin constituting 20% of the solids. The resulting binder was sprayed on glass wool fibers which were thereafter compressed in the form of a batt suitable for insulation and then heated to 250° C. to remove water and cure the resinous ingredients of the binder. A batt having good mechanical properties was obtained and it was further found that the batt was not subject to punking at temperatures as high as 500° C.

For comparative purposes, there was prepared a binder at 15% solids concentration in which the above described reaction product was replaced with a reaction product prepared identically except that the boric acid was omitted and the amount of maleic anhydride increased by a quantity equivalent stoichiometrically to the boric acid. By experimentation it was found that the amount of phenolic resin in the binder could not exceed 10% of the solids without resulting in a batt that was subject to punking at the same temperature.

The difference between the reaction products prepared in this example is further emphasized by a comparison of their relative rates of thermal decomposition and their B.t.u. contents. The following data was obtained:

| Reaction Product | B.t.u. Content | Relative Rate of Thermal Decomposition |
|---|---|---|
| Boric Acid-modified | 8,990 | 9.65 |
| Without Boric Acid | 9,153 | 12.15 |

*Example 2*

The procedure of Example 1 was followed in preparing a reaction product from the following ingredients:
18.15 parts maleic anhydride.
8.83 parts ethylene glycol.
44.7 parts pentaerythritol.
4.11 parts boric acid.

The reaction was carried to an acid number of 45 and the reaction product, exclusive of water, contained 5.9% $BO_3$.

The reaction product was diluted with water to provide a solution having 5% solids. This solution exhibited substantially the characteristics of the solution of Example 1.

*Example 3*

Other reaction products were prepared in a manner similar to that of Example 1 with adjustment of the quantities of maleic anhydride and boric acid to provide reaction products containing 3.8% and 4.45% $BO_3$, respectively. Aqueous solutions of the reaction products at 10% solids have the same characteristics of the solution of Example 1. It is thus demonstrated that the $BO_3$ content of the reaction products can be fairly widely varied to obtain the benefits of the invention.

The examples have illustrated the use of various polyhydric alcohols and various mixtures of polyhydric alcohols. However, not all polyhydric alcohols are operable so far as providing the reaction products which are useful in this invention. Thus, it appears that the useful polyhydric alcohols are those having from 2 to 6 inclusive OH groups per molecule or mixtures thereof. The polyhydric alcohol employed must contain no oxygen except in the form of OH groups. Ether alcohols such as the polyethylene glycols are accordingly excluded. As has been previously stated, the OH/C ratio must be in the range of 0.6 to 1.0, inclusive. By virtue of this limitation, alcohols such as hexamethylene glycol, etc. are excluded. Taking all of the aforesaid limitations with respect to the polyhydric alcohols into account it can be seen that alcohols such as ethylene glycol, propylene glycol, glycerol, pentaerythritol, mannitol, sorbitol, etc. or their mixtures may be employed. The term "functionality" as herein applied to alcohols refers exclusively to the number of hydroxyl groups per molecule of the alcohol.

As has been explained previously, the reaction products employed in accordance with this invention must be heat-convertible, i.e., they must be convertible to the insoluble, infusible state when heated in the presence of air at a temperature below the decomposition temperature thereof.

Reaction products of the type here considered can be classified into two groups: (a) those which are reaction products of maleic acid, boric acid, and a dihydric alcohol as, for example, ethylene glycol, and (b) those which are reaction products of maleic acid, boric acid, and a polyhydric alcohol which comprises a polyhydric alcohol having a functionality greater than 2. Group (b) includes, for example, reaction products of maleic acid and boric acid with glycerol, reaction products of maleic acid and boric acid with a mixture of ethylene glycol and glycerol, etc. It is well known to the art that the group (a) products cannot be converted to the insoluble, infusible state solely by the mechanism of esterification. Polymerization of the double bonds of the maleic acid groups plays a dominant role in the conversion. On the other hand, the group (b) products can be formulated to convert to the insoluble, infusible state, solely by the mechanism of esterification, as well as by a combination of esterification and polymerization of the maleic acid double bonds. Both types of reaction products, if properly formulated, may be converted to the insoluble, infusible form by the application of heat. Hence, such properly formulated reaction products may be said to be heat-convertible.

With respect to group (b) reaction products, it is preferred to employ such reaction products which are formulated so that they can be converted by esterification alone. although the reaction products are so designed, the maleic double bonds can also play a part in the conversion, particularly if the conversion is carried out under conditions favorable for this reaction, such as heating in the presence of air or peroxides. As a result, reaction products so formulated convert much more quickly under milder conditions and yield harder and tougher conversion products due to a greater amount of cross-linking. Reaction products designed so that they may be converted by esterification alone can be formulated within certain limits known to the art. Thus, to obtain conversion to the insoluble, infusible state by esterification alone, a ratio of hydroxyl to carboxyl groups should be used which does not exceed the maximum limit defined by the following relationship:

(1) $$R(\max.) = \rho(f-2) + 1$$

where R is the OH/H+ ratio, $f$ is the number of hydroxyl groups per molecule of the alcohol having a functionality greater than 2, and $\rho$ is the ratio of the number of hydroxyl groups supplied by the alcohol having a functionality greater than the 2 to the number of hydroxyl groups in the initial formulation. In cases where a mixture of polyhydric alcohols each having a different functionality greater than 2 is used, the average molecular functionality is used for $f$. It will be understood that the aforesaid equation is applicable with respect to reaction products prepared from either a mixture of a dihydric alcohol and a polyhydric alcohol having functionality greater than 2 or from only a polyhydric alcohol having a functionality greater than 2. Also, in each case, the polyhydric alcohol having a functionality greater than 2 may be made up of a mixture of polyhydric alcohols each having the same or different functionalities greater than 2. Likewise, the dihydric alcohol may consist of a mixture of dihydric alcohols.

The useful reaction products, as has been mentioned previously, are those having at least half of the acid groups originally presented by the reactants esterified. Hence, the theoretical minimum value of R is 0.5, since this represents a formulation in which there is sufficient hydroxyl to esterify only half the total number of available acid groups. However, an R value of 0.6 represents the practical minimum for the purposes of this invention.

It will be understood that the above-described maximum R values define only the preferred reaction products of the group (b) type which are useful in accordance with this invention. Reaction products formulated on the basis of higher R values than the above-described maxima may be heat-convertible due to the presence of the ethylenic double bonds in the maleic acid groups therein. Any such reaction products which are heat-convertible may be employed in accordance with this invention.

Turning now to reaction products of the type of the above-described group (a), i.e., reaction products of maleic acid, boric acid, and a dihydric alcohol, it is well known to the art that such reaction products cannot be converted to the insoluble, infusible stage solely by the mechanism of esterification. The predominant factor in the conversion of such products is polymerization of the ethylenic double bonds of the maleic acid groups contained therein. Any such reaction products which will heat-convert may be used in accordance with this invention, although it is preferred to use those reaction products formulated on the basis of an R value of from 0.6 to 1.8, and still further preferred to use those reaction products formulated on the basis of an R value of 0.9 to 1.2.

Referring to reaction products of both group (a) and group (b), as shown by the graphic relationship in this application (the figure), reaction products formulated with low R values lose the property of water-dilutability at very high acid numbers but those reaction products formulated with large excesses of alcohol retain the property of water-dilutability until the esterification is carried to comparatively low acid values. Thus, in applications where water solutions of resins with comparatively low acid numbers are needed formulations with rather high R values can be used. However, in such applications stronger conditions for advancing or converting the resins will be required as compared with resins formulated on the basis of lower R values.

Aqueous solutions of reaction products prepared from a mixture of pentaerythritol and ethylene glycol constitute a preferred embodiment of the invention. They are especially preferred due to the fact that the ultimate cured resins in the form of films, etc. evidence an exceptionally high degree of flexibility. It is still further preferred that these two alcohols be employed in such proportions that there are present from 4.0 to 4.5 chemical equivalents of pentaerythritol per chemical equivalent of ethylene glycol.

In preparing the subject reaction products various reaction temperatures can be employed, and the invention is not to be considered as limited in this respect. The preferred temperatures are from 120°–200° C., with temperatures from 170–190° C. being most preferred. When one of the reactants is liquid at normal temperatures, the simplest procedure is to make a dispersion of the solid ingredients in the liquid and apply heat to this dispersion, as, for example, in the case of glycerol, maleic anhydride, and boric acid. Where none of the reactants is liquid at normal temperatures as, for example, in the case of pentaerythritol, maleic anhydride, and boric acid, sufficient water can be added to provide a fluid slurry. This technique is illustrated by Example 1. On the other hand, the maleic anhydride can be first melted and the pentaerythritol and boric acid slurried in the melt.

The aqueous solutions of this invention will contain at least a substantial amount of water, i.e., at least sufficient water to provide a composition that is truly liquid in character. Generally, the compositions as sold contain at least about 15% of water. On the other hand, all of the reaction products described herein can be dissolved in water and diluted therewith at least to the extent of providing solutions of 15% solids. Certain of the reaction products, particularly those having substantially higher acid values than the minimum values defined by line AB of the figure, can be diluted still further without encountering precipitation. Aqueous solutions having a reaction product concentration of from about 2% to about 75% have been found most useful for most applications.

It has been mentioned heretofore that a unique characteristic of the instant recation products or resins lies in the fact that they do not require alkaline solubilizing agents such as ammonium hydroxide to take them in solution in water. While this is true, it is also true that the use of small amounts of alkaline solubilizing agents is not precluded if for any reason their use may be especially beneficial in a given case. For example, a small amount of ammonia water is a useful additive to the aqueous solutions of this invention for the purpose of neutralization thereof. Neutralization may be necessary when the aqueous solution is to be used in conjunction with an emulsion which is unstable at lower pH values than 7.0. Furthermore, in the case of aqueous solutions which will stand dilution to 15% solids but no more, a small amount of ammonia will provide somewhat further dilutability.

The aqueous solutions of this invention can be used per se as coating, impregnating, sizing, or bonding compositions. However, they may also be used in conjunction with other water-soluble film-formers as, for example, water-soluble glues such as animal glue, fish glue, etc., water-soluble cellulose derivatives such as sodium carboxymethylcellulose, methyl cellulose, etc., water-soluble gums such as gum arabic, tragacanth, etc., etc. Additional possible components include water-soluble dyes and water-dispersible pigments.

By varying the ratio of the number of hydroxyl to the number of carboxyl groups in the initial formulation not only the water-solubility and dilutability of the resins or incipient resins used in this invention can be altered, but also the speed and ease with which the resins are heat-converted to the insoluble, infusible state can be varied.

The speed of cure or conversion of these resins is in general sufficiently fast that the use of catalysts to accelerate the rate of cure is not necessary. Such catalysts may, however, be employed if desired. Thus, for example, peroxide catalysts such as benzoyl peroxide, etc., may be employed to accelerate the rate of cure as may oxidation catalysts of the metal drier type such as cobalt acetate, cobalt naphthenate, etc.

The compositions of this invention have been found particularly useful as binders for glass wool fibers in the manufacture of insulating batts. Dilute aqueous solutions of the desired reaction product (resin) and other components are applied to the glass fibers. The resin is subsequently heat-converted to an insoluble, infusible water-resistant state. This application takes advantage of several properties of the subject aqueous solutions. In view of the fact that they can be diluted to low concentrations they may be easily applied by spray application. The cost is low due to the fact that solutions of very low concentrations of resin do an effective job of binding the wool fibers. The resulting glass fiber batts possess good water resistance, excellent toughness, and good punking resistance.

Among other uses of the subject aqueous solutions the the following may be mentioned. They may be used as sizing materials for glass cloth and yarn to prevent fraying. They may also be used as binders for abrasives. Another use lies in the manufacture of plywood and other laminated structures. These aqueous solutions may also be used in the manufacture of brake linings in which use the ultimate resin functions as a binder.

All parts and percentages in the specification and claims are by weight unless otherwise indicated.

What I claim and desire to protect by Letters Patent is:

1. A composition suitable for coating and impregnating applications comprising an aqueous solution of a heat-convertible reaction product of a polyhydric alcohol, boric acid, and an $\alpha,\beta$-unsaturated compound, said polyhydric alcohol being selected from the class consisting of polyhydric alcohols of from 2 to 6 hydroxyl groups per molecule and mixtures thereof, said polyhydric alcohol containing no functional groups other than OH groups, containing no oxygen except in the form of OH groups, and having an OH/C ratio of from 0.6 to 1.0, said $\alpha,\beta$-unsaturated compound being selected from the class consisting of fumaric acid, maleic acid, and maleic anhydride, said reaction product being one having at least half of the COOH groups originally presented by the reactants esterified as evidenced by the acid value of the reaction product but at the same time having an acid value of at least the minimum value for the particular OH/H$^+$ ratio employed as defined by line AB of the figure, said reaction product containing from about 1.5 to 8% BO$_3$ and being soluble in water without the aid of any alkaline solubilizing agent, said composition combining the properties of dilutability with water to at least 15% concentration of the reaction product in water, and the ability to provide insoluble, infusible films by heat-conversion.

2. The composition of claim 1 wherein the polyhydric alcohol comprises pentaerythritol.

3. The composition of claim 2 wherein maleic anhydride is employed as the $\alpha,\beta$-unsaturated compound.

4. The composition of claim 1 wherein the polyhydric alcohol is a mixture of pentaerythritol and ethylene glycol.

5. The composition of claim 4 wherein the $\alpha,\beta$-unsaturated compound is maleic anhydride.

6. The composition of claim 5 wherein from 4.0 to 4.5 chemical equivalents of pentaerythritol per chemical equivalent of ethylene glycol are employed.

7. The composition of claim 1 wherein maleic anhydride is employed as the $\alpha,\beta$-unsaturated compound.

8. A heat-convertible polyester of a polyhydric alcohol selected from the group consisting of ethylene glycol, propylene glycol, glycerol, pentaerythritol, mannitol, sorbitol and mixtures thereof and an unsaturated dicarboxylic compound selected from the group consisting of fumaric acid, maleic acid and maleic anhydride and about 2% to 8% by weight based on the total weight of the reactants of boric acid, the OH/COOH ratio of the reactants being within the operable area defined by the figure in U.S. Patent 2,646,410 which polyester can be diluted with water to at least 15% concentration of polyester solids in water.

References Cited by the Examiner

UNITED STATES PATENTS

| 1,969,761 | 8/34 | Rosenblum | 260—2.5 |
| 1,970,510 | 8/34 | Ellis | 260—22 |
| 2,646,410 | 7/53 | Kneisley | 260—75 |

FOREIGN PATENTS 358,491   10/31   Great Britain.

WILLIAM H. SHORT, *Primary Examiner.*

W. G. BENGEL, D. ARNOLD, L. H. GASTON, MILTON STERMAN, P. E. MANGAN, H. N. BURSTEIN, LOUISE P. QUAST, *Examiners.*